United States Patent [19]
Croyle et al.

[11] Patent Number: 5,529,101
[45] Date of Patent: Jun. 25, 1996

[54] HIGH PERFORMANCE RADIAL TIRE

[75] Inventors: Warren L. Croyle, Akron; Jerold R. Buenger, Hartville; Rudy E. Consolacion, Akron; Randall R. Brayer, Uniontown, all of Ohio

[73] Assignee: The Goodyear Tire & Rubber Company, Akron, Ohio

[21] Appl. No.: 43,133

[22] Filed: Mar. 25, 1994

Related U.S. Application Data

[63] Continuation of Ser. No. 736,184, Jul. 26, 1991, abandoned.

[51] Int. Cl.$^6$ .................................................... B60C 11/13
[52] U.S. Cl. .................................. 152/209 R; 152/209 A
[58] Field of Search ....................... 152/209 R, 209 A, 152/209 D, DIG. 3

[56] References Cited

U.S. PATENT DOCUMENTS

| | | |
|---|---|---|
| 3,055,410 | 9/1962 | Caulkins . |
| 3,586,086 | 6/1971 | Boileau ................................ 152/209 R |
| 3,664,402 | 5/1972 | Montague . |
| 4,177,850 | 12/1979 | Ogawa et al. . |
| 4,284,115 | 8/1981 | Ohnishi ............................... 152/209 R |
| 4,299,264 | 11/1981 | Williams ............................. 152/209 R |
| 4,385,654 | 5/1983 | Sumikawa . |
| 4,446,901 | 5/1984 | Endo et al. . |
| 4,449,560 | 5/1984 | Tansei et al. . |
| 4,550,756 | 11/1985 | Hinkel . |
| 4,732,194 | 3/1988 | Saneto et al. ....................... 152/209 A |
| 4,796,683 | 1/1989 | Kawabata et al. . |
| 4,815,511 | 3/1989 | Brayer et al. ....................... 152/209 R |
| 4,832,099 | 5/1989 | Matsumoto . |
| 4,995,437 | 2/1991 | Enoki et al. . |

FOREIGN PATENT DOCUMENTS

| | | |
|---|---|---|
| 4117734A1 | 6/1991 | European Pat. Off. . |
| 0819836 | 10/1937 | France ................................. 152/209 R |
| 0993870 | 11/1951 | France ................................. 152/209 R |
| 193704 | 10/1985 | Japan .................................. 152/209 R |
| 0299406 | 12/1987 | Japan .................................. 152/209 R |
| 68406 | 3/1988 | Japan . |
| 0061605 | 3/1988 | Japan .................................. 152/209 A |
| 3042306 | 2/1991 | Japan .................................. 152/209 D |
| 3125607 | 5/1991 | Japan .................................. 152/209 R |
| 1237616 | 6/1971 | United Kingdom . |
| 1347239 | 2/1974 | United Kingdom ............... 152/209 R |

OTHER PUBLICATIONS

Abstract of JA 3-42306.
Patent Abstracts of Japan vol. 12, No. 292 (M-729)(3139) 10 Aug. 1988.
Patent Abstracts of Japan vol. 12, No. 292 JP-A-6368406 (Bridgestone) 28 Mar. 1988).
Translation of Japan 60-193704.

*Primary Examiner*—Steven D. Maki
*Attorney, Agent, or Firm*—David L. King

[57] ABSTRACT

A high performance, radial tire having a tread, the tread has an intermediate groove between first and second lateral edges, circumferential grooves between the first lateral edge and the intermediate groove, and a circumferential groove or grooves between the second lateral edge and the intermediate groove. Each groove has a first and second wall wherein the first wall of each groove is on the side of the groove nearest to the first lateral edge and the second wall being on the opposite side of the groove, the respective first and second groove walls having an angular orientation $\theta_1$, $\theta_2$ relative to a line perpendicular to a tangent to the tread surface curvature as approximately defined at the center of the groove wherein $\theta_1$, is the angular orientation of the first wall and $\theta_2$ is the angular orientation of the second wall, the angular orientation $\theta_1$ is greater than the angular orientation $\theta_2$ for each groove between the first lateral edge and the intermediate groove, the angular orientation $\theta_2$ is equal to or greater than the angular orientation $\theta_1$ at the intermediate groove and at the circumferential groove or grooves between the second lateral edge and the intermediate groove, the angular orientation $\theta_1$ of the first walls and the angular orientation $\theta_2$ of the second walls of the circumferential grooves forming an included angle of less than 30° as measured between intersecting lines tangent to and extending generally radially inwardly along the first and second groove walls.

4 Claims, 7 Drawing Sheets

HIGH PERFORMANCE RADIAL TIRE

This is a continuation of application Ser. No. 07/736,184 filed on Jul. 26, 1991, now abandoned.

BACKGROUND OF THE INVENTION

The invention relates to a tread for a pneumatic tire. The treated is particularly well suited for high performance tires.

In the conventional design of a tread for a pneumatic tire there are provided ground or road contacting elements in the form of ribs or blocks. The ribs or blocks are spaced by non-road contacting grooves. The grooves are channels or voids which allow water to be moved into them so that the ground contacting surfaces can maintain good traction. In the absence of grooves, the tread under wet conditions would lose ground contact, a thin layer or film of water would be between the tire and the road and a phenomena called hydroplaning would result. Under severe hydroplaning conditions the tire loses traction and control of the vehicle can be lost.

The design of a tire tread is a compromise. Under dry conditions the maximum amount of tread contacting the road is optimum. For example, the tire treads used at the Indianapolis 500 race are smooth and 100% of the tread while in the footprint of the tire contacts the road. In the event of rain the race stops.

As one is required to drive under less than ideal dry conditions a tread with 100% ground contact is not practical. The tread is therefore provided with groves to accommodate wet or snowy road conditions. In passenger tires, the ratio of areas of ground contacting elements to voids within the area of road contact, otherwise known in the tire art as the "footprint", is relatively high, generally in the 60% to 75% range. This high net-to-gross ratio enables the tire to be designed with minimal noise and vibration characteristics.

To design a tire with a high net-to-gross ratio yet good traction under wet conditions requires a tremendous amount of skill. The conflicting nature of the design requirements requires a fine balance in selecting the appropriate features for a successful tire tread design.

In high speed and high performance tires the performance of the vehicle is generally limited to the ability of the tires to respond.

This is particularly true in high speed cornering.

As a vehicle enters a turn the weight of the vehicle shifts, loading the outer set of tires while reducing the load on the inner set of tires. The tires deflect such that the outer shoulder area of the tread is in ground contact on the outer set of tires while the inner shoulder area of the lighter loaded inner set of tires is in ground contact. The resultant lateral loads must be absorbed by these ground contacting elements. It is desirable therefore that the ground contacting ribs or block elements be laterally stiff in order to absorb the lateral forces generated by the cornering vehicle.

The present invention describes a tread having improved lateral stiffness and superior high speed cornering.

SUMMARY OF THE INVENTION

A high performance radial tire having an axis and a tread, the tread has first and second lateral edges, a tread surface, an intermediate groove between the first and second lateral edge, circumferential grooves between the first lateral edge and the intermediate groove, and a circumferential groove or grooves between the second lateral edge and the intermediate groove, wherein the intermediate groove, the circumferential grooves between the first lateral edge and the intermediate groove, and the circumferential groove or grooves between the second lateral edge and the intermediate groove define rib or block tread elements is described. Each groove has a first and second wall wherein the first wall of each groove is on side of the groove nearest to the first lateral edge and the second wall being on the opposite side of the groove. The respective first and second groove walls have an angular orientation $\theta_1, \theta_2$ relative to a line perpendicular to a tangent to the tread surface curvature as approximately defined at the center of the groove wherein $\theta_1$, is the angular orientation of the first wall and $\theta_2$ is the angular orientation of the second wall. The angular orientation $\theta_1$ is greater than the angular orientation $\theta_2$ for each groove between the first lateral edge and the intermediate groove. The angular orientation $\theta_2$ is equal to or greater than the angular orientation $\theta_1$ at the intermediate groove and at the circumferential groove or grooves between the second lateral edge and the intermediate groove. The angular orientation $\theta_1$ of the first wall and the angular orientation $\theta_2$ of the second walls of the circumferential grooves forming an including angle of less than 30° as measured between intersecting lines tangent to and extending generally radially inwardly along the first and second groove walls. Preferably each groove or grooves between the second lateral edge and the intermediate groove the an angular orientation $\theta_2$ is greater than $\theta_1$. The angular variation for each of the circumferential grooves located between the first lateral edge and the intermediate groove ($\theta_1$ minus $\theta_2$ for each of the circumferential grooves located between the first lateral edge and the intermediate groove) is 6° to 20°.

Definitions "Axial" and "axially" are used herein to refer to lines or directions that are parallel to the axis of rotation of the tire.

"Circumferential" means lines or directions extending along the perimeter of the surface of the annular tread perpendicular to the axis direction.

"Radial" and "radially" are used to means directions radially toward or away from the axis of rotation of the tire.

"Lateral" means an axial direction.

"Compensated Tread Width" means the tread width multiplied by the aspect ratio.

"Aspect Ratio+ of a tire means the ratio of the section height to the section width.

"Footprint" means the contact patch or area of contact of the tire tread with a flat surface at zero speed and under normal load and pressure, including the area occupied by grooves as well as the tread elements.

"Net-to-gross" means the total area of ground contacting tread elements with the footprint divided by the gross area of the footprint.

"Groove" means an elongated void area in a tread that may extend circumferentially or laterally about the tread in a straight, curved, or zig-zag manner. Circumferentially and laterally extending grooves sometimes have common portions and may be subclassified as "wide", "narrow", or "slot". The slot typically is formed by steel blades inserted into a cast or machined mold or tread ring therefor. In the appended drawings, slots are illustrated by single lines because they are so narrow. A "slot" is a groove having a width in the range from about 0.2% to 0.3% of the compensated tread width, whereas a wide groove has a width (W) greater than 2% of the compensated tread width, an intermediate width groove has a width ⅓ to ¾ W, and a narrow groove has a width of ⅒ to ⅓ W. The "groove width" is equal portion, the width of which is in question, divided by the length of such groove or groove portion; thus, the groove width is its average width over its length. Grooves, as well as other voids, reduce the stiffness of the tread regions in which they are located. Slots often are used for this purpose, as are laterally extending narrow or wide grooves. Grooves may be of varying depths in a tire. The depth of a groove may vary around the circumference of the tread, or the depth of one groove may be constant but vary from the depth of another groove in the tire. If such narrow or wide grooves are of substantially reduced depth as compared to wide circumferential grooves which they interconnect, they are regarded as forming "tie bars" tending to maintain a rib-like character in the tread region involved.

"Sipe" means small slots molded into the tread elements of a tire that subdivided the tread surface and improve traction.

"Inside Shoulder+ means the shoulder nearest the vehicle.

"Outside Shoulder+ means the shoulder farthest away from the vehicle.

"Rib+ means a circumferentially extending strip of rubber on the tread which is defined by at least one circumferential groove and either a second such groove or a lateral edge, the strip being laterally undivided by full-depth grooves.

"Tread Element+ means a rib or a block element.

"Equatorial plan (EP)+ means the plane perpendicular to the tire's axis of rotation and passing through the center of its tread.

BRIEF DESCRIPTION OF THE DRAWINGS

FIG. 4 is an enlarged a portion of the tread cross section as illustrated in FIG. 3. FIG. 4 depicts the angular orientation of the first and second groove walls.

FIGS. 5A and 5B illustrate the effective contact patch of a set of tires having the tread illustrated in FIGS. 1–4; FIG. 5A represents a vehicle traveling in a straight line and FIG. 5B represents a vehicle making a let turning maneuver.

FIG. 8 is a portion of the tread cross-section illustrated in FIG. 7. FIG. 8 depicts the angular orientation of the first and second groove walls.

DETAILED DESCRIPTION OF THE INVENTION

Figure 1:
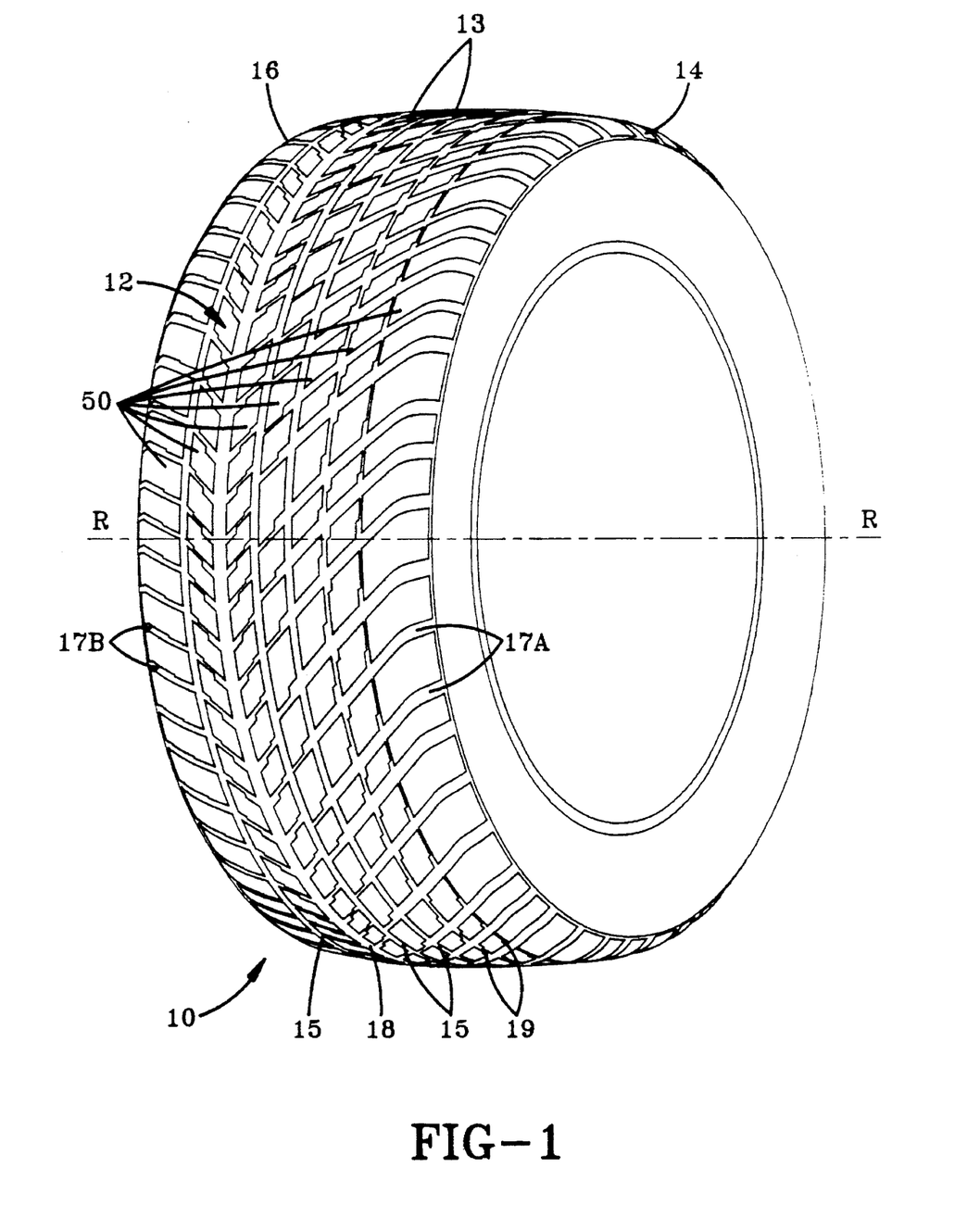
FIG. 1 is a perspective view of the tread of the present invention attached to a tire.

In FIG. 1, a tread 12 according to the present invention is illustrated attached to a pneumatic tire 10. The tread when angularly configured as illustrated has an axis R, first and second lateral edges 14 and 16, a plurality of tread elements 50 with a tread surface 52 and a plurality of circumferential grooves 15, 18 and 19, and lateral grooves 17A and 17B.

Figure 2:
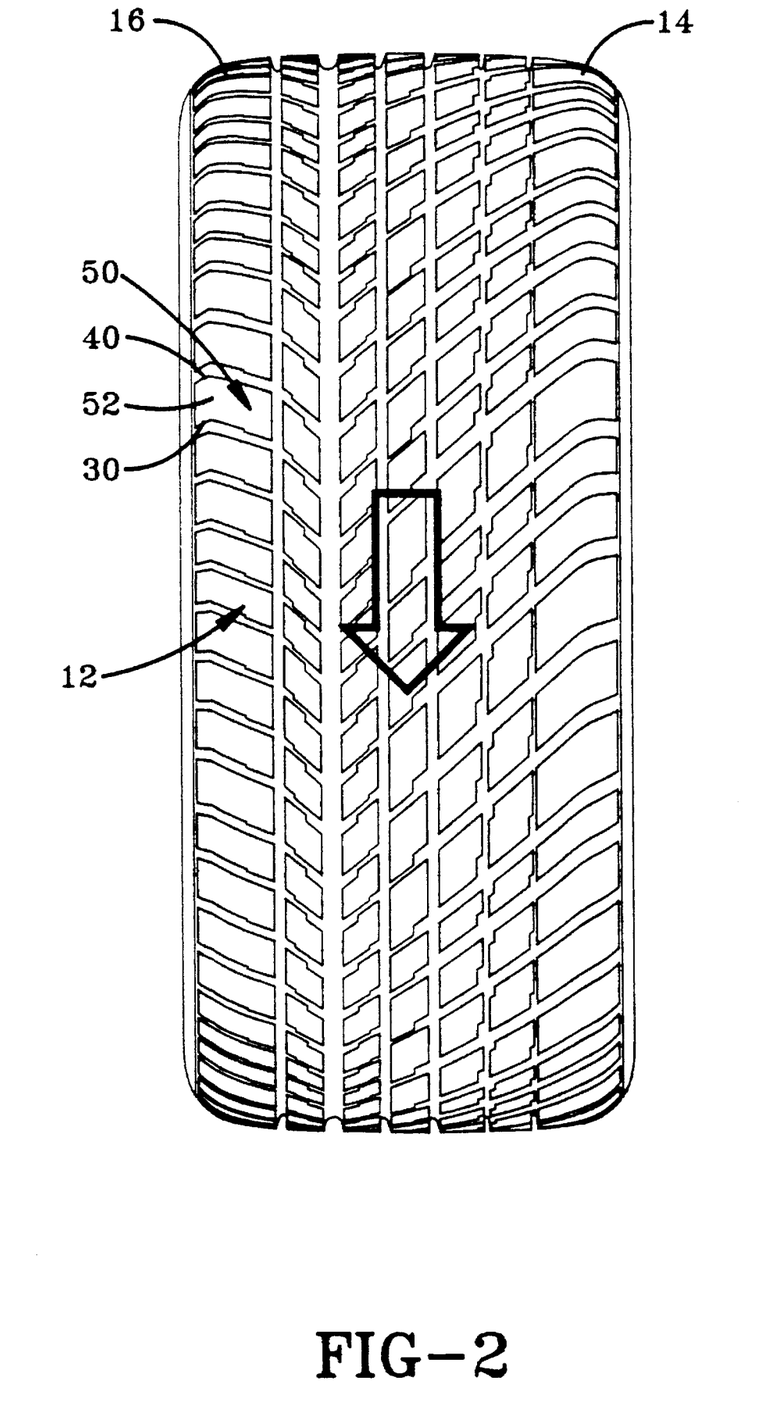
FIG. 2 is a plan view of the tread of FIG. 1.
Figure 3:
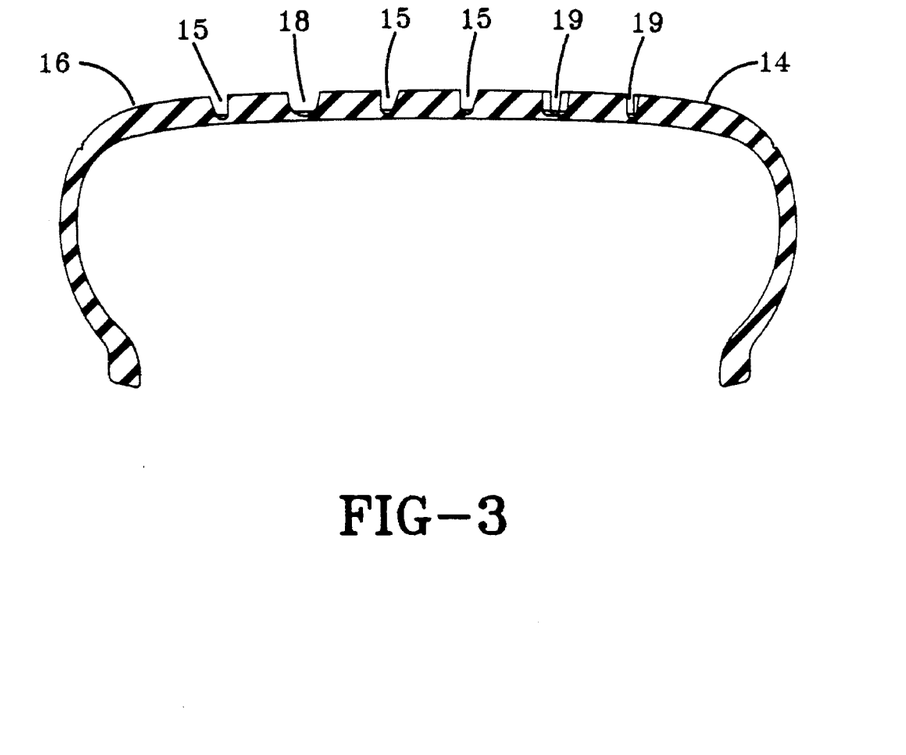
FIG. 3 is an cross-sectional view of the tire and tread as illustrated in FIG. 2.
Figure 4:
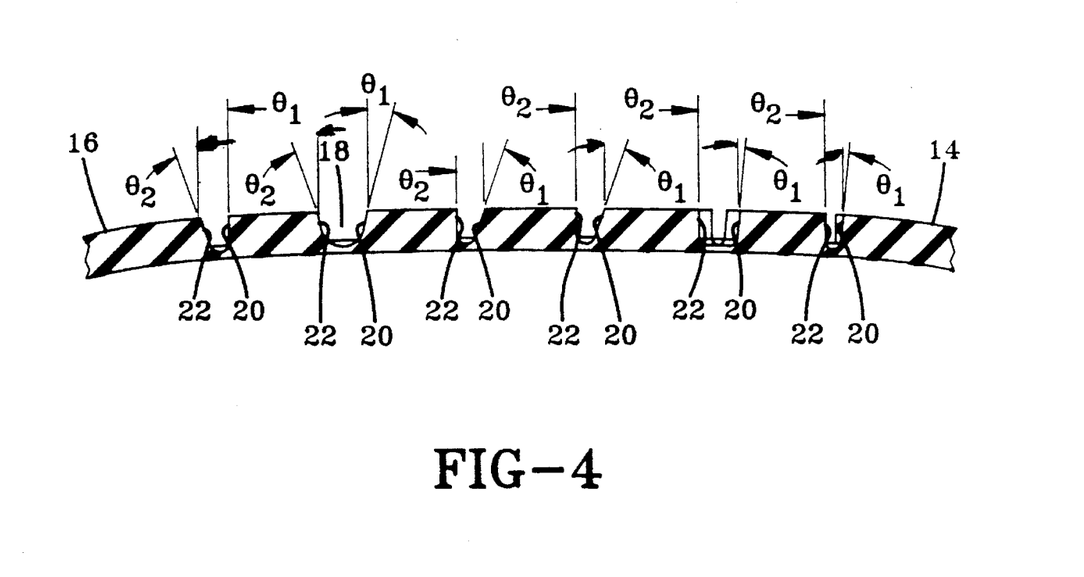

As illustrated in FIGS. 1 through 4 the grooves define rib or block tread elements 50. All circumferential grooves have first and second walls 20 and 22 respectively as shown in FIG. 4. The first walls 20 are on the side of the groove in a first axial direction and the second walls 22 are on the opposite side of the groove.

The respective groove walls have an angular orientation $\theta_1$, $\theta_2$ relative to a line perpendicular to a tangent to the tread surface curvature as approximately defined at the center of the groove. $\theta_1$ is the angular orientation of the first wall while $\theta_2$ is the angular orientation of the second wall. As illustrated in FIG. 4, the first and second walls have an angular variation wherein the first walls of the grooves have an angular orientation $\theta_1$ greater than the angular orientation $\theta_2$ of the second wall as a function of axial distance from the first lateral edge. That is $\theta_1 > \theta_2$ for each groove between the first lateral edge 14 and the intermediate groove 18.

At the groove 18 intermediate the first and second lateral edges 14, 16 the angular variation changes wherein the second wall 22 has an angular orientation equal to or greater than the orientation of the first wall 20 at the intermediate groove 18 and at any circumferential groove or grooves position between the second lateral edge 16 and the intermediate groove 18.

In the preferred embodiment of the invention the tread 12 as illustrated in FIG. 1–FIG. 4 is asymmetrical and directional. The tread pattern is designed with a wide circumferential groove 18 located in proximity to the second lateral edge 16 and not centered at the equatorial plane of the tread. The illustrated tread 12 is also directional in that the tire 10 has a preferred forward travel direction. This pattern means that a set of tires includes a pair of left side and a pair of right side tires for a vehicle.

The first lateral edge 14 is located at the outboard side of the tire and the second lateral edge 16 is located of the inboard side of the tire.

The illustrated tread 12 is the subject of a co-pending patent application Ser. No. 07/736,182, the description of the tread being incorporated by reference.

The above described tread 12 also has a unique configuration of lateral grooves 17A and 17B at the tread shoulders. The lateral grooves 17 have leading and trailing edge surfaces 30, 40. The trailing edge surfaces 40 have a negative angular orientation. The description of the lateral grooves are described in detail in a co-pending patent application Ser. No. 07/736,189 which is hereby incorporated by reference.

The tread 12 as illustrated incorporates two independent pitches. The pitches differing in number, lengths, and orientation. The detailed description of the pitching is described in co-pending patent application Ser. No. 07/736,192 which is hereby incorporated by reference.

The tread 12, as described above with a changing angular variation of the circumferential groove walls, permits an increase in lateral stiffness to be accomplished without sacrificing the ground contacting surface area of the tread elements.

As illustrated in FIGS. 1–4 the first lateral edge 14 would be located at the outside position relative to a vehicle while the second lateral edge 16 would be at the inside position relative to a vehicle. The angle $\theta_1$ of the first wall 20 is greater than the angle $\theta_2$ of the second wall 22 for the circumferential grooves located between the first lateral edge 14 and the intermediate groove 18.

The angle $\theta_1$, in the region between the intermediate groove 18 and the first lateral edge 14, has an angle of inclination relative to a plane perpendicular to a tangent to the tread surface.

The inclination $\theta_1$ slopes the first wall as illustrated in FIGS. 2–4. The first wall being sloped reinforces the adjacent tread element against lateral forces. This stiffens the tread element and improves the cornering capability of the tire. The second wall has an angular orientation $\theta_2$ opposite to and less in magnitude than $\theta_1$. This ensures that the ground contact area remains large while at the same time the groove void area is not reduced as compared to conventional grooves having equal angled groove walls.

In prior art tires the walls of the circumferential grooves are inclined oppositely in orientation yet equally in magnitude. That is $\theta_1$ equals $\theta_2$.

By using the angular variation discussed above an increase in lateral stiffness is achieved without sacrificing or reducing the circumferential groove void area or the ground contact surface area across the tread laterally. The large $\theta_1$ angle relative to $\theta_2$ for grooves located between the first lateral edge 14 and the intermediate groove 18 in effect braces the tread element at the first wall 20.

Figure 5A:
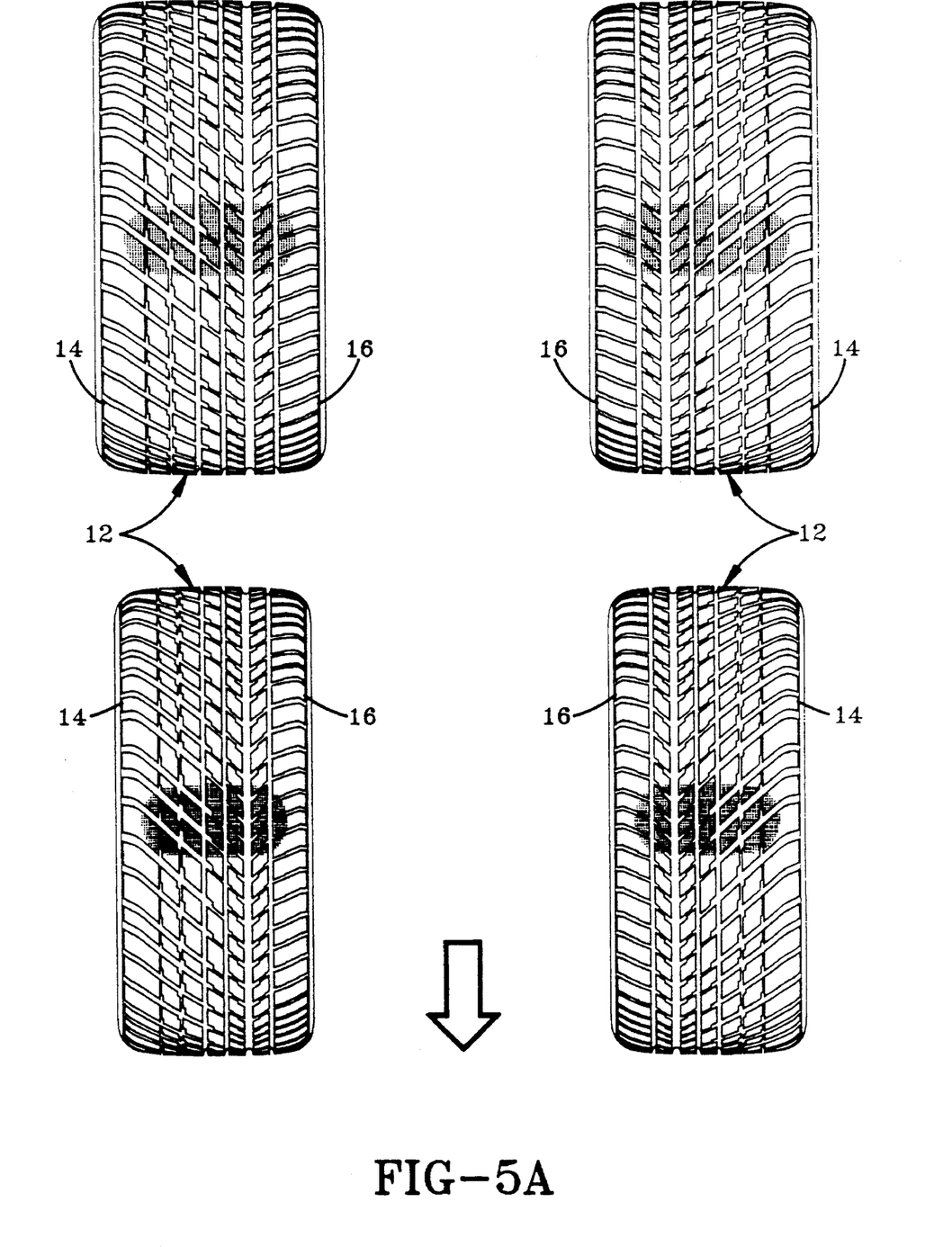
Figure 5B:
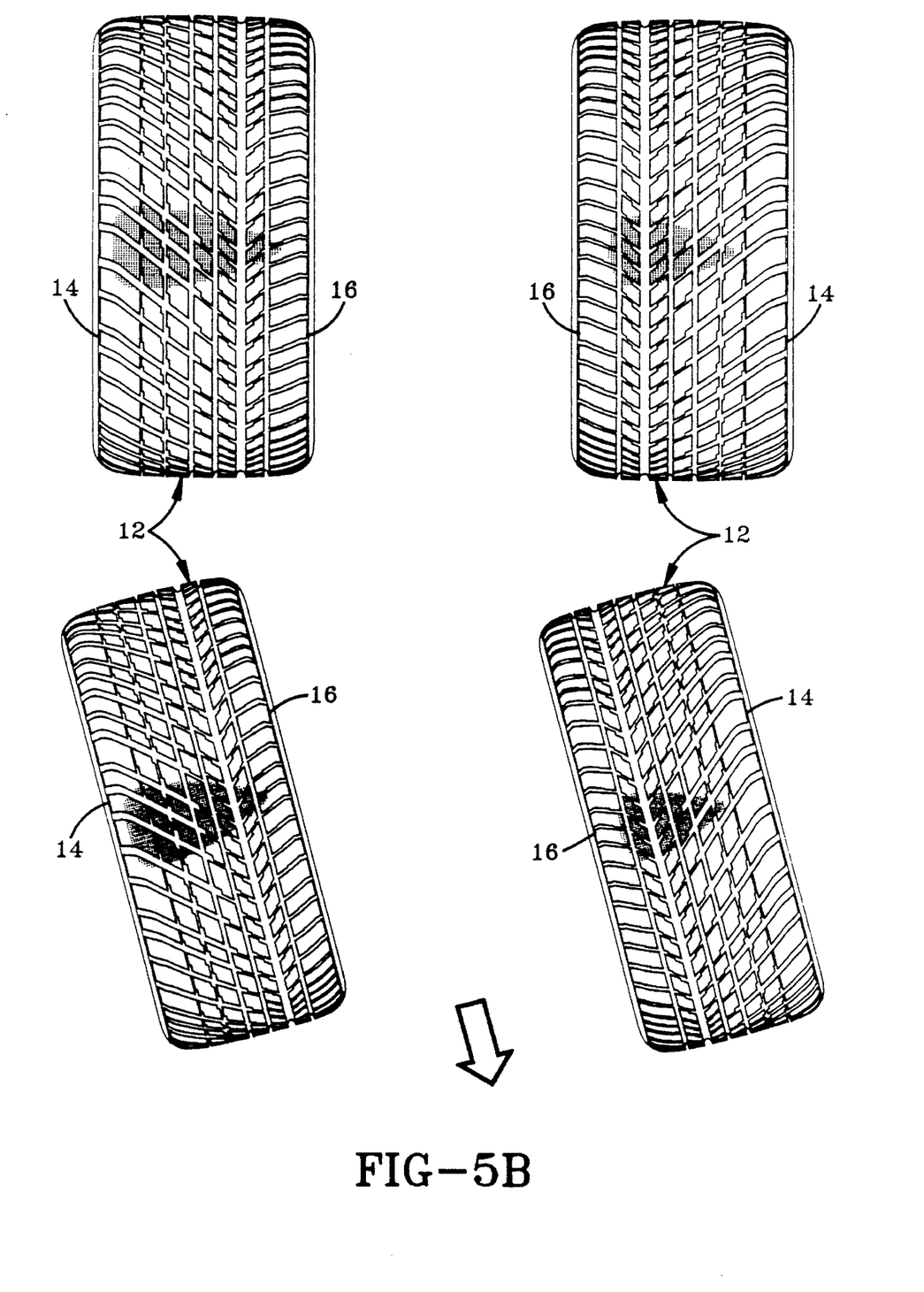

The tires when mounted on a vehicle will respond to a turn whereby the outside tires absorb a majority of the vehicle weight. The outsides tires will resist the lateral forces primarily at the outside shoulder region of the tire as illustrated by FIG. 5b. FIG. 5A shows a set of tires and their respective footprints in all four wheel positions traveling in a straight line. The tires are normally loaded and inflated. FIG. 5b illustrate the theoretical shift in effective footprint as the vehicle turns.

The vehicle relies primarily on the outer tires to resist a majority of the lateral forces.

At the intermediate groove 18 the angular variation changes such that $\theta_2$ is equal to or greater than $\theta_1$ in magnitude. At this region, the second wall 22 is either equally or greater reinforced than the first wall 20.

In the preferred embodiment the intermediate groove 18 is positioned between the equatorial plane and the second lateral edge 16.

Figure 6:
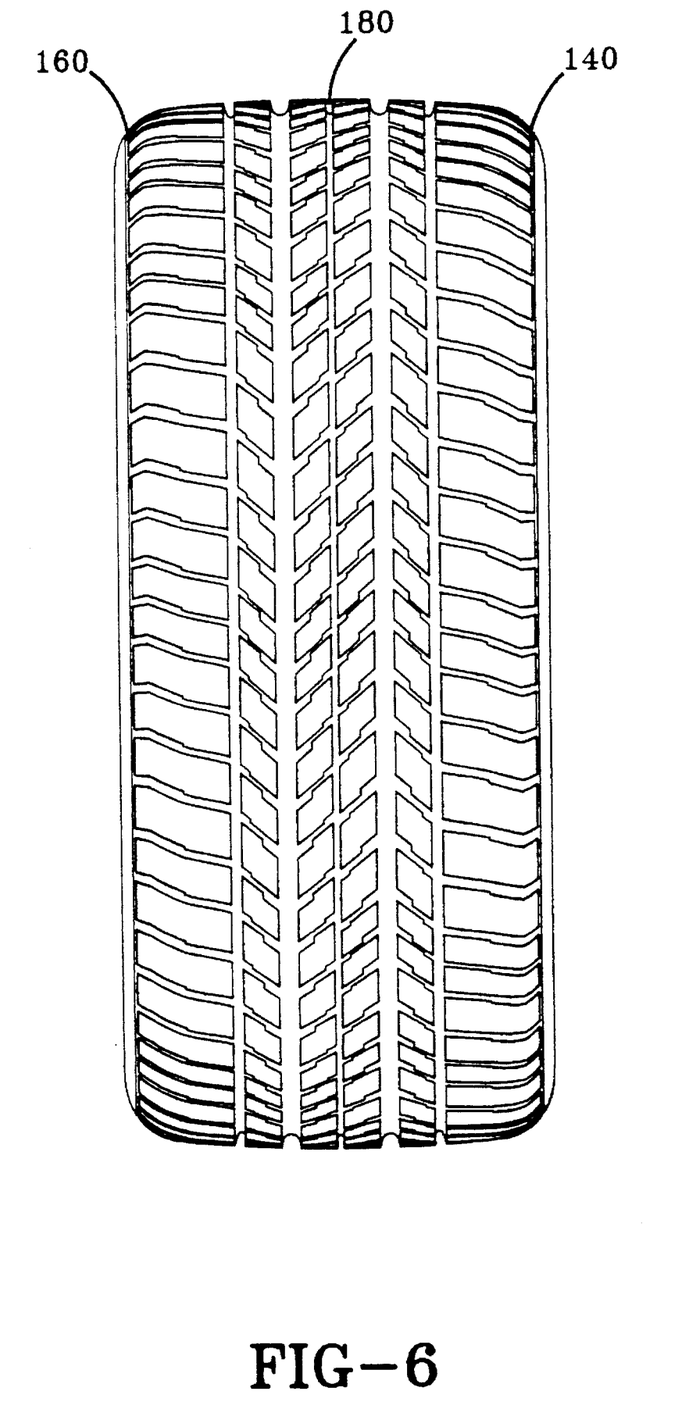
FIG. 6 in an alternate embodiment of the tread.
Figure 7:
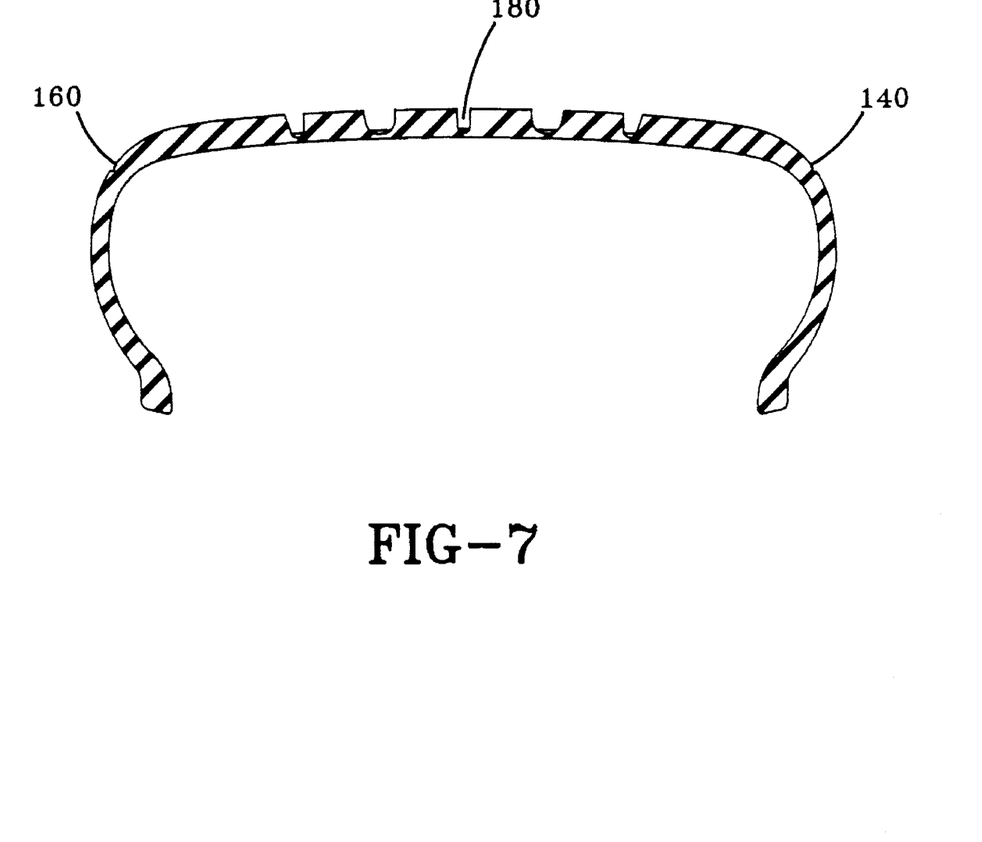
FIG. 7 is a cross-sectional view of the tread of FIG. 6.
Figure 8:
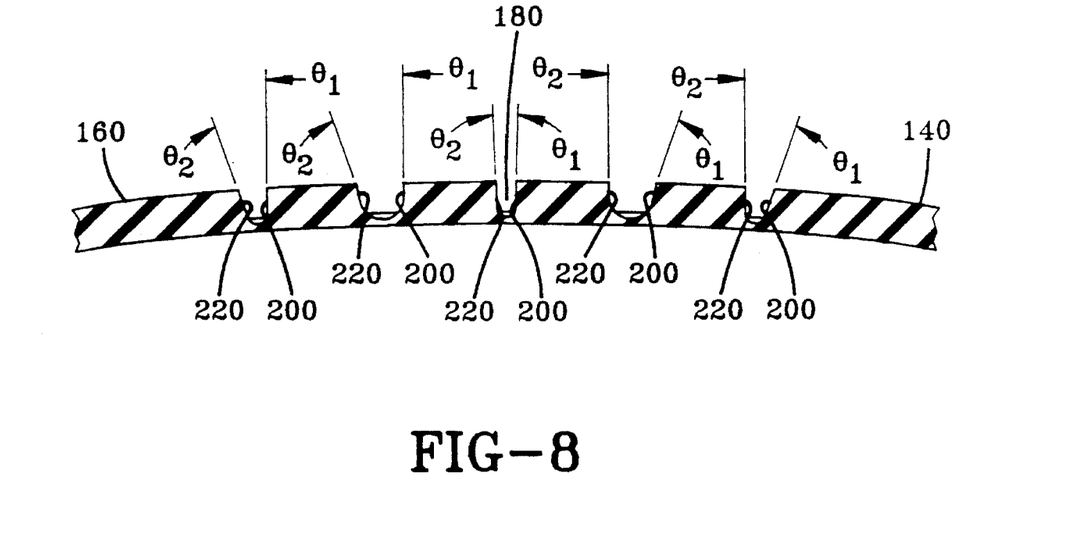

As illustrated in FIGS. 6, 7, and 8 the intermediate groove 180 may be centered. A symmetrical tread pattern as illustrated would permit the tire to be produced with a non-directional tread pattern. The groove walls preferably would be angularly inclined such that the inboard side grooves would be similar but oppositely inclined relative to the outboard side grooves. The directions of travel would thus not effect the reinforcing at the lateral edges. The change in angular variation would occur at the centered intermediate groove 180.

In the preferred embodiment, the tread, as illustrated in FIG. 1-4, has six circumferential grooves. Starting from the outside shoulder or first lateral edge and progressing axially inwardly, the tread has a first narrow circumferential groove 19 with a first wall 20 inclined at 6° a second wall 22 at 0°; a second narrow circumferential groove 19 with a first wall 20 inclined at 6° and a second wall 22 at 0°; a first intermediate width groove 15 with a first wall 20 at 20° incline and a second wall 22 at 0° incline; a second intermediate width groove with a first wall 20 inclined at 20° and a second wall 22 at 0°; a wide intermediate groove 18 wherein the angular orientation changes, the intermediate groove 18 having first and second walls 20, 22 equally but oppositely inclined at 12°; and a third intermediate width groove 15 having a first wall 20 at 0° and a second wall 22 at 20°, the third intermediate width groove being between the intermediate groove 18 and the inside shoulder or second lateral edge 16.

The angular variation ranges from 6° to 20° in the preferred embodiment. The higher the angle the greater the lateral stiffness of the tread element adjacent the inclined wall.

The outside two narrow circumferential grooves are designed with a 6° inclination at the first wall and 0° at the second wall. In sharp cornering high lateral forces are exerted on the tread elements, adjacent these grooves. The narrow grooves are allowed to actually close. The groove void is thus occupied by the laterally outer adjacent tread element. This element contacts the laterally inner adjacent tread element, resulting in a cooperative stiffening of the tread laterally. This in combination with the angularly variant groove walls enhances lateral stiffness.

The intermediate width grooves 15 located between first lateral edge 14 and the wide intermediate groove 18 are angularly braced at higher angles of inclination at the first wall.

It is believed that the included angle between the first and second groove wall, $\theta_1+\theta_2$ should be below 30°, preferably below 25°. This insures that the ground contact area remains large. In the illustrated preferred embodiment of FIGS. 1–4 the three intermediate width grooves each have a combined $\theta_1+\theta_2$ of 20, the wide intermediate groove 18 has a combined included angle of 24°, and the two narrow grooves each have a combined included angle $\theta_1+\theta_2$ of 6°.

The above combination of angular orientation of groove walls maximizes the amount of ground contact in an axial direction while still providing several large water evacuating grooves.

The tread in the best mode of practicing the invention includes the utilization of crowned block elements. The description of such elements is to be found in U.S. Pat. No. 4,722,378 and is incorporated herein by reference. Treads have been constructed and tested with crowned elements and without such crowned elements. Improvements in lateral cornering forces have been observed in both tread versions when compared to tires with a conventional tread design with equal angled circumferential grooves.

In one such series of experimental tests, Goodyear Eagle "Gatorback" ZR50 tires were constructed with circumferential grooves angled according to the present invention without crowed elements. As a control conventional Goodyear Eagle "Gatorback" ZR50 tires having circumferential groove with conventional angled walls, the first wall equal to the second wall, were tested. All tires were of a P245/50Z16 size.

In terms of subjective handling the conventional tires rated 7.5 in regard to steering response while the test tire according to the present invention rated 7.5+. Steering response is the subjective measure on a scale of 1–10 of a tire's ability to change direction.

Response linearity is the ability of a tire to generate increasing cornering force in direct proportion to steering wheel input. The control tires rated 8.0 while the test tires rated 9.0. The test driver commented that the test tire had more rear slide and snappy recovered. This illustrates an increase in cornering stiffness for the angled groove tire.

In wet handling conditions the test tire had a faster lap time of 50.59 second versus 50.70 second for the control tires on a wet test track using the same vehicle.

In dry handling on a longer track the test tire ran a time of 1.22.71, compared to a time of 1:23.05 for the control tire, or a 0.31 sec. per lap improvement. According to the driver the tires subjectively felt about the same.

The cornering coefficient at a 1.0° slip angle was improved 1.2%. The conventional tire rated 0.3722 versus the angled grooves rating of 0.3766. The cornering coefficient measures the lateral force divided by the normal force and is a indication of the tires ability to make high speed turns.

The overall data of the test tires when compared to the commercially available Goodyear Eagle ZR50 tires shows an improvement in cornering capability when the ZR50 tire is produced with the circumferential grooves angled as described according to the present invention. The improvement is particularly significant when one considered that the standard Eagle ZR50 tire is a high performance tire exhibiting excellent handling characteristics.

It is not required that the intermediate groove, where the transition or angular variation changes, must have equal angled side walls. The intermediate groove, can have angle $\theta_2$ greater than or equal to $\theta_1$.

Although the preferred tread has wide, intermediate width, and narrow circumferential grooves, benefits of the invention can be obtained with other configurations of the circumferential grooves. Also, variations in groove shape or construction can be employed. The circumferential grooves may be straight, zig-zag or sinusoidal. The tread may or may not also employ lateral grooves, to form block elements in the tread.

It is claimed:

1. A radial tire having an axis and a tread, the tread comprising first and second lateral edges, a compensated tread width defined as the tread width multiplied by the aspect ratio of the tire, a tread surface, an intermediate groove between the first and second lateral edge, circumferential grooves between the first lateral edge and the intermediate groove including a narrow circumferential groove laterally adjacent the first lateral edge and a circumferential groove or grooves between the second lateral edge and the intermediate groove, the intermediate groove being a wide groove having a width (W), the width of the wide intermediate groove (W) being greater than 2% of the compensated tread width wherein the intermediate groove, the circumferential grooves between the first lateral edge and the intermediate groove, and the circumferential groove or grooves between the second lateral edge and the intermediate groove define tread elements, each groove having a first and second wall wherein the first wall of each groove is on the side of the groove nearest to the first lateral edge and the second wall being on the opposite side of the groove, the respective first and second groove walls having an angular orientation $\theta_1$, $\theta_2$ relative to a line perpendicular to a tangent to the tread surface curvature as approximately defined at the center of the groove wherein $\theta_1$ is the angular orientation of the first wall and $\theta_2$ is the angular orientation of the second wall, the angular orientation $\theta_1$ is greater than the angular orientation $\theta_2$ for each groove between the first lateral edge and the intermediate groove, the angular orientation $\theta_2$ is equal to or greater than the angular orientation $\theta_1$ at the intermediate groove and at the circumferential groove or grooves between the second lateral edge and the intermediate groove, the angular orientation $\theta_1$ of the first walls and the angular orientation $\theta_2$ of the second walls of the circumferential grooves forming an included angle of less than 30° as measured between intersecting lines tangent to and extending generally radially inwardly along the first and second groove walls, the narrow circumferential groove adjacent the first lateral edge having a width of 1/10 to 1/3 of the width of the wide intermediate groove (W), wherein the narrow groove closes under sharp cornering lateral forces such that the laterally outer tread element adjacent the narrow groove contacts the laterally inner adjacent tread element resulting in a cooperative stiffening of the tread laterally.

2. The tire of claim 1 wherein $\theta_1$ minus $\theta_2$ for each of the circumferential grooves located between the first lateral edge and the intermediate groove is 6° to 20°.

3. The radial tire of claim 1 wherein for each groove or grooves between the second lateral edge and the intermediate groove the angular orientation $\theta_2$ is greater than $\theta_1$.

4. The radial tire of claim 1 wherein the intermediate groove is located between the second lateral edge and the equatorial plane.

* * * * *